(12) United States Patent
Saila et al.

(10) Patent No.: US 8,737,666 B2
(45) Date of Patent: May 27, 2014

(54) APPARATUS FOR AUDIO COMMUNICATION

(75) Inventors: Sami Saila, Halikko (FI); Mikael Jaakkola, Turku (FI)

(73) Assignee: Nokia Corporation, Espoo (FI)

( * ) Notice: Subject to any disclaimer, the term of this patent is extended or adjusted under 35 U.S.C. 154(b) by 1335 days.

(21) Appl. No.: 12/520,854

(22) PCT Filed: Dec. 22, 2006

(86) PCT No.: PCT/EP2006/012468
§ 371 (c)(1),
(2), (4) Date: Jun. 30, 2010

(87) PCT Pub. No.: WO2008/077424
PCT Pub. Date: Jul. 3, 2008

(65) Prior Publication Data
US 2010/0310107 A1 Dec. 9, 2010

(51) Int. Cl.
*H04R 25/00* (2006.01)
(52) U.S. Cl.
USPC ............ 381/375; 381/323; 381/380; 379/430
(58) Field of Classification Search
USPC ......... 381/331, 370, 371, 374, 375, 380, 381, 381/384; 379/430, 438; 455/550.1, 569.1, 455/575.1, 575.6; 320/108
See application file for complete search history.

(56) References Cited

U.S. PATENT DOCUMENTS

| | | | |
|---|---|---|---|
| 6,269,259 B1 * | 7/2001 | Lai | 455/569.1 |
| 6,396,935 B1 | 5/2002 | Makkonen | 381/334 |
| 6,952,617 B1 | 10/2005 | Kumar | |
| 7,076,277 B2 * | 7/2006 | Kim et al. | 455/569.1 |
| 7,120,267 B2 * | 10/2006 | Ito et al. | 381/375 |
| 2003/0157972 A1 | 8/2003 | Bae | |
| 2004/0229658 A1 | 11/2004 | Kim et al. | |
| 2005/0008184 A1 | 1/2005 | Ito et al. | |
| 2005/0107131 A1 | 5/2005 | Abramov | |

FOREIGN PATENT DOCUMENTS

| | | |
|---|---|---|
| GB | 2 294 177 A | 4/1996 |
| GB | 2 317 301 A | 3/1998 |
| WO | 9616498 A | 5/1996 |
| WO | 2006107274 A | 10/2006 |
| WO | 2006129290 A | 12/2006 |

OTHER PUBLICATIONS

International Search Report and Written Opinion of the International Searching Authority for PCT Application No. PCT/EP2006/012468, dated Aug. 4, 2008, 14 pages.
Motorola Store, Retrieved Aug. 25, 2011, from, http://motorola.digitalriver.com/store/motostor/DisplayCategoryListPage/categoryID.972000, 2 pages.

* cited by examiner

*Primary Examiner* — Huyen D Le
(74) *Attorney, Agent, or Firm* — Harrington & Smith

(57) ABSTRACT

A headset (10) for audio communications comprising a speaker housing (11) and a boom (12) for a microphone (41, 51), the headset arranged to provide a retracted state and an extended state, wherein the boom is arranged to be wrapped around the speaker housing in the retracted state and be unwrapped from the speaker housing in the extended state. The headset may be used as a hands-free unit for a telephone.

11 Claims, 3 Drawing Sheets

APPARATUS FOR AUDIO COMMUNICATION

RELATED APPLICATION

This application was originally filed as PCT Application No. PCT/EP2006/012468 filed 22 Dec. 2006.

The invention relates to an apparatus for audio communication, in particular relating to headsets comprising an earpiece and a microphone.

BACKGROUND

Typically, a headset for audio communication comprises at least an earpiece and a microphone, with the microphone often attached to a boom extending from the earpiece. Such a boom arrangement allows the microphone to be located towards a user's mouth, thereby allowing for clearer reception of the user's voice. The boom also provides holds then the speaker away from the microphone to reduce the likelihood of feedback problems. Such headsets may commonly be used with telephone systems, either mobile or fixed, for dictation or in other applications where hands-free operation is advantageous.

GB2294177 discloses a typical headset having a housing that extends over a user's head, the headset having a boom extending in front of a user's mouth. The headset may be connected by wire to a telephone.

More compact headsets are also possible, in which the earpiece can be hooked around or located within a user's ear, rather than by use of a housing extending over a user's head. Such headsets may also incorporate a microphone boom, which can take various forms. The boom may be flexible, and form part of a deformable loop for an adjustable fit around a user's ear, as disclosed in U.S. Pat. No. 6,396,935. To allow for a more compact form when not in use, the boom may be telescopic, being extendable from the earpiece in one or more sections, as for example disclosed in GB2317301. The boom may alternatively be pivoted, as disclosed in U.S. Pat. No. 7,076,277. Activation or extension of the boom may trigger activation of the headset apparatus, for example when receiving or making a telephone call. The headset may be activatable also from a mobile terminal that is in connection with the headset.

Such headsets may be connected by wire or by wireless communication with a telephone or other communication or recording apparatus. An example of a known means of wireless communication commonly used with headsets for portable radio telephone applications is that according to Bluetooth™ protocols. An earpiece may comprise a Bluetooth™ module, which allows for two-way wireless communication with a corresponding module in a separate apparatus such as a portable telephone.

A problem with previous solutions is that the microphone boom may occupy a substantial part of the earpiece when not in use. Furthermore, extension of, say, a sliding boom does not allow for a large increase in length, since the maximum length increase is dictated by the retracted length. Using a telescopic boom, as in GB2317301, allows for a more compact retracted state but with an increase in mechanical complexity, together with a difficulty with electrically connecting the microphone to the earpiece in the extended state.

The listing or discussion of a prior-published document in this specification should not necessarily be taken as an acknowledgement that the document is part of the state of the art or is common general knowledge.

SUMMARY

According to an aspect of the invention, there is provided a headset for audio communications comprising a speaker housing and a boom for a microphone, the headset arranged to provide a retracted state and an extended state, wherein the boom is arranged to be wrapped around the speaker housing in the retracted state and be unwrapped from the speaker housing in the extended state.

In this way, apparatus of the invention may be made more compact and mechanically simplified as compared with previously known headsets.

The headset may be used as a hands-free unit for a telephone.

According to another aspect of the invention, there is provided a method of operating an audio communications headset, the headset arranged to have a low power mode and a high power mode, and wherein the headset comprises a speaker housing and a boom for a microphone, the headset arranged to provide a retracted state and an extended state, wherein the boom is arranged to be wrapped around the speaker housing in the retracted state and be unwrapped from the speaker housing in the extended state, and wherein the retracted state is associated with the lower power mode and the extended state is associated with the high power mode, the method comprising changing the state of the headset to switch the headset between the low and high power modes.

According to a further aspect of the invention, there is provided a computer program arranged to detect the state of a headset, the headset arranged to have a low power mode and a high power mode, and wherein the headset comprises a speaker housing and a boom for a microphone, the headset arranged to provide a retracted state and an extended state, wherein the boom is arranged to be wrapped around the speaker housing in the retracted state and be unwrapped from the speaker housing in the extended state, and wherein the retracted state is associated with the lower power mode and the extended state is associated with the high power mode, and wherein the computer program is arranged to switch the headset between the low power mode and the high power mode based on the detected configuration of the headset. Wherein the high power mode is associated with the use of the headset to make use of one or more functions of an apparatus associated with the headset.

According to a further aspect of the invention, there is provided a headset for audio communications comprising a means for housing a speaker and a means for resiliently providing a microphone in use in a held state towards the mouth of a user, the headset arranged to provide a retracted and an extended state, wherein the means for providing the microphone in the held state is arranged to be wrapped around the speaker housing in the retracted state and be unwrapped from the speaker housing in the extended state to be held towards the mouth of a user. According to a further aspect of the invention, there is provided a headset for audio communications comprising a means for housing a speaker and a means for resiliently providing a microphone in a held state away from the means for housing the speaker, the headset arranged to provide a retracted and an extended state, wherein the means for providing the microphone in the held state is arranged to be wrapped around the means for housing the speaker in the retracted state and to be unwrapped from the means for housing the speaker in the extended state.

Any circuitry of the headset may include one or more processors, memories and bus lines. One or more of the circuitries described may share circuitry elements.

The present invention includes one or more aspects, embodiments and/or features of said aspects and/or embodiments in isolation and/or in various combinations whether or not specifically stated (including claimed) in that combination or in isolation.

BRIEF DESCRIPTION OF THE DRAWINGS

A description is now given, by way of example only, with reference to the accompanying drawings, in which:—

DETAILED DESCRIPTION

Figure 1:
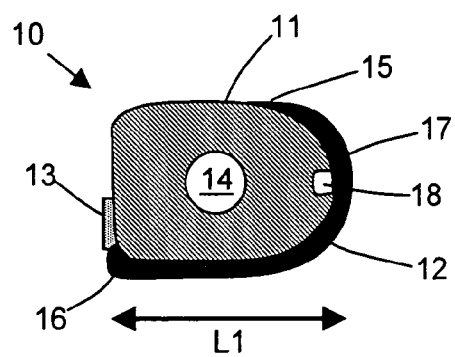
FIG. 1 is a plan view of a headset in a retracted configuration.

Apparatus in the form of a headset 10 as shown in FIG. 1 comprises a housing 11 for an earpiece or speaker and a boom 12. The boom 12 is attached to the housing 11 at a proximal end 15, and is shown in FIG. 1 wrapped around a peripheral edge 17 of the housing 11. The distal end 16 of the boom is held in place by means of a latch 13. The latch 13 may be releasable by operating a button 14 on the housing 11. Optionally, the button 14 also serves the function of electronically activating the housing 11, for example when receiving a telephone call to be communicated through the headset 10. A microphone is provided at the distal end 16 of the boom 12.

With the boom 12 in the retracted position shown in FIG. 1, a crosswise (to the peripheral edge 17) recess 18 provided in the housing 11 allows the headset 10 to be secured to a carrying strap (not shown), which may for example be a necklace. Such an arrangement allows for convenient access to the headset when required. The boom 12 in the retracted position shown in FIG. 1 secures the carrying strap to the headset 10. Releasing the boom 12 allows for separation from the carrying strap (FIG. 2).

As shown in FIG. 1, the headset 10 with the boom 12 in the retracted state has a retracted length L1. When the boom 12 is released from the retracted state, the boom 12 extends from the housing 11 to take up an extended form, as shown in FIG. 2. The distal end 16 of the boom 12 travels a path approximately indicated by arrow 21 as it unwraps from around the housing 11. Any carrying strap secured to the housing 11 by means of the aperture formed by the recess 18 and the boom 12 is thereby released.

Although the embodiment of FIG. 1 shows the boom 12 tightly wrapped around the perimeter of the housing 11, this may not be the case in other embodiments. One or more gaps may be provided between the perimeter of the housing 11 and the retracted boom 12. This may, for example, allow a carrying strap (e.g. necklace/pendant) to be placed in the one or more gaps to allow for the headset to be carried (including worn).

Figure 2:
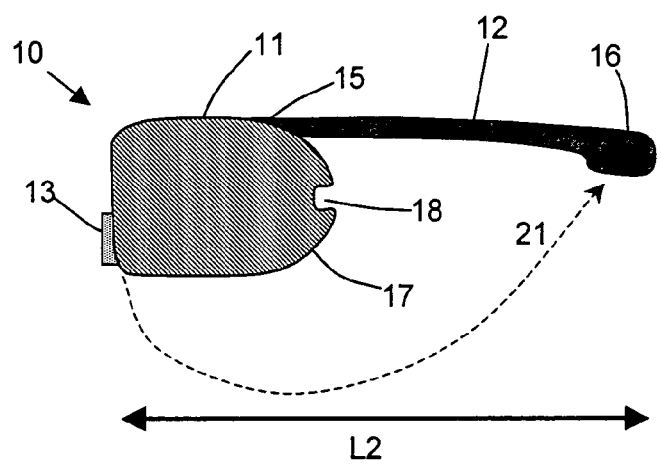
FIG. 2 is a plan view of the headset of FIG. 1 in an extended configuration.

In the extended configuration shown in FIG. 2, the headset 10 with boom 12 takes up an extended length L2. This length in the particular illustrated example is over twice the length L1 in the retracted state, because the increase in length is taken up around the periphery of the housing 11 rather than linearly extending from the housing 11, as previously known from other retractable booms. In this way, a long boom can be extended from a relatively small headset, obtaining the advantage of having a clearer voice reception without the disadvantages of a larger headset and/or a more complex mechanical arrangement.

The boom 12 may be a resiliently flexible arm housing for the microphone (or resiliently flexible arm for attaching a microphone). The boom 12 may comprise a resiliently flexible elongate member such as a length of spring steel, to provide the boom with sufficient elastic flexibility to accommodate its retracted and extended forms. The flexible member may be sufficiently resilient to bias the boom 12 towards the extended configuration when the boom is released. The flexible member may be covered with a protective layer of, for example, a polymeric material.

The boom 12 may also serve as an aerial or antenna for transmission of signals to and from a separate device such as a telephone. Such an antenna may, for example, be suitable for Global System for Mobile communications (GSM) services, Global Positioning Satellite (GPS) services, Bluetooth™ or wireless Local Area Network (WLAN) connectivity. The boom 12 may alternatively be used as a ground plane or reference continuation for an antenna.

The boom 12 may also serve to be used in charging the headset 10. For example, the boom 12 may comprise one or more inductive loops 22. Furthermore, one or more of the electrical components 23 held within the housing 11 (and/or the microphone at the distal end 16 of the boom 12) may be arranged to be charged by means of inductive coupling with the one or more boom inductive loops 22. This may be by the electrical components (e.g. speaker) themselves being connected to respective one or more inductive loops 24 such that when the boom 12 is in the retracted state, the boom inductive loops 22 may be electrical engagement with the electrical component inductive loops 24 to provide for charging for one or more of the components of the headset 10. The charge would be supplied to the boom inductive loops and inductively passed onto the electrical component inductive loops.

The flexible member may be composed of any one or more of a number of suitable materials, including metallic materials such as nickel-titanium or beryllium-copper alloys (being of the type particularly suitable for applications where flexibility is important) or other types of materials such as polymers. The boom may also comprise wiring for connection of a microphone in the distal end 16 to the housing 11, the wiring being provided within the protective polymer layer or within an aperture in the flexible member. Various types of flexible wiring arrangements are known in the art, one such example being polyamide-based flexible printed circuit board constructions.

The boom 12 is sufficiently stiff or resilient to hold the microphone in place when the headset is in use, i.e. to provide the microphone in a held state away from (or towards) the mouth of a user or, alternatively put, to provide the microphone in a held state away from the housing 11.

An advantage of the boom 12 comprising a resilient flexible elongate member is that the boom may be quickly and automatically extended when released from the retracted configuration, since the member is biased towards the extended position. In one embodiment, the boom may be arranged to be quickly and automatically retracted when released from the extended configuration.

The boom 12 may alternatively comprise a series of mechanical linkages configured to allow the boom to conform to the shape of the housing 11 and to extend to a similar extended configuration shown in FIG. 2. Biasing of the boom towards the extended configuration may be achieved in a number of ways, for example by means of a biased tensioning member provided along an outer edge of the boom. The biased tensioning member may not necessarily be provided all along the outer edge of the boom.

Securing the boom 12 to the housing 11 with a releasable latch 13 allows a user to easily, and with a single action, release the boom 12 from its retracted configuration.

Figure 3:
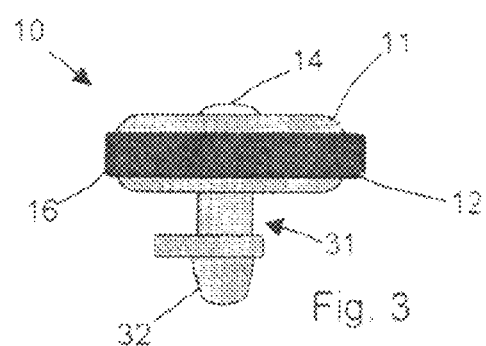
FIG. 3 is an elevation view of the headset of FIG. 1 in the retracted configuration.

As shown in FIG. 3, the headset 10 also comprises an ear fitting extension 31 comprising an ear bud 32. In the embodiment shown, the ear bud 32 is configured to fit within an ear canal of a user, thus securing the headset 10 in place. Other fitting mechanisms to the user can be employed.

It is to be understood that the headset 10 may be provided in left- or right-handed versions, depending on user preferences and choice of ear for the headset to be worn in or on. The headset 10 may alternatively be provided in an ambidextrous or adjustable version suitable for use in either ear.

Alternatively or additionally, the headset may comprise a hook or loop arrangement to allow the housing 11 to be secured around an ear of a user. Such a hook or loop may be removably attachable to the housing 11.

Figure 4:
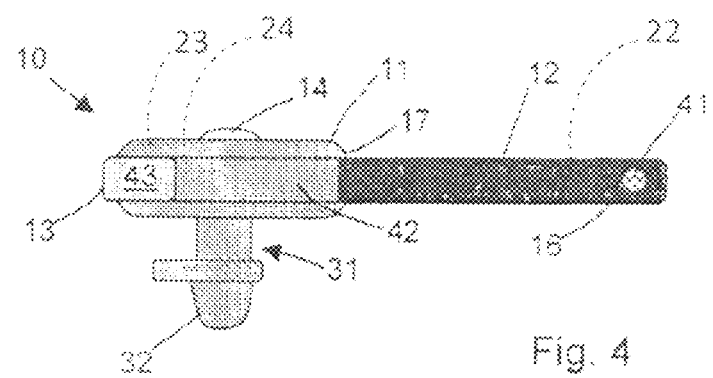
FIG. 4 is an elevation view of the headset of FIG. 2 in the extended configuration.

Shown in FIG. 4 is the headset 10 of FIG. 3 when in the extended configuration, with the boom 12 extending from the housing 11. In this particular embodiment, the boom 12 extends from a grooved recess 42 formed in the peripheral edge 17 of the housing 11. The grooved recess 42 may be provided to more effectively locate the boom 12 around the housing 11 when in the retracted configuration. The aforementioned carrying strap recess 18 (of FIG. 1) is not shown in the embodiment of FIG. 4.

A microphone 41 is provided at the distal end 16 of the boom 12. The latch 13 may be provided in a recess 43 within the housing 11, and be configured, i.e. shaped, to accommodate the shape of the distal end 16 of the boom 12. The latch 13 may be a magnetic or mechanical latch. The button 14 may be operable to mechanically/electrically release the latch 13. The button 14 may also be operable to electronically activate the headset 10, for example when receiving a telephone call.

Figure 5:
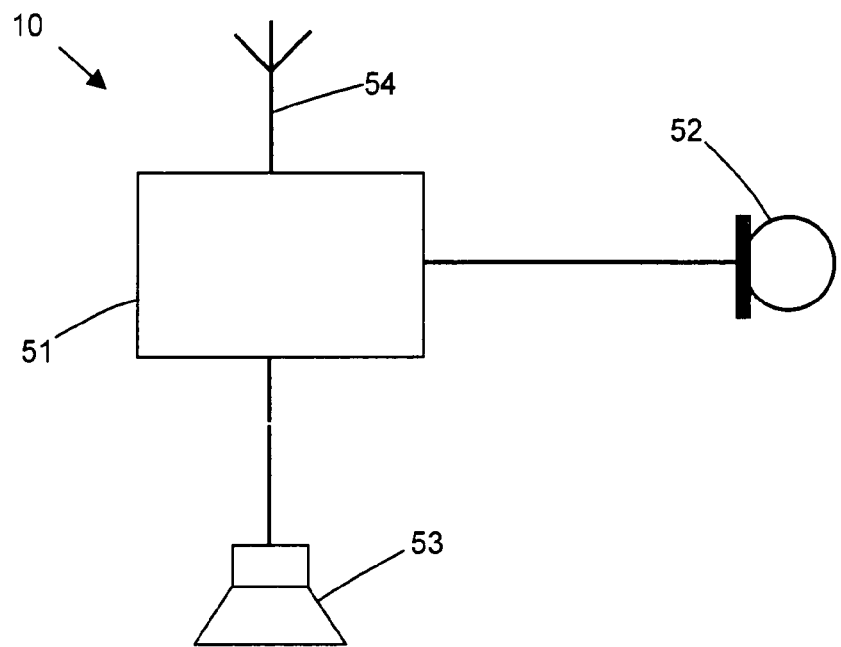
FIG. 5 is a schematic diagram of components and their relative connections for an exemplary headset.

A schematic representation of the electrical operation of an exemplary headset 10 is shown in FIG. 5. The headset 10 comprises a processor/controller unit 51, which is configured to receive signals from a microphone 52, send audio signals to a loudspeaker 53, and receive and transmit signals from and to an aerial 54 for communicating with an external apparatus. Alternatively, the aerial 54 may be replaced with a wired connection.

The processor/controller 51 typically comprises various electronic components to process audio signals to and from the loudspeaker 53 and microphone 52 respectively, and components to generate signals for, and receive signals from, the aerial 54. The processor/controller 51 may also comprise other inputs such as an input from the button 14 to indicate when the microphone 52 and loudspeaker 53 are to be activated.

As an alternative, the microphone 52 may be connected to the controller/processor 51 by a wireless link.

Figure 6:
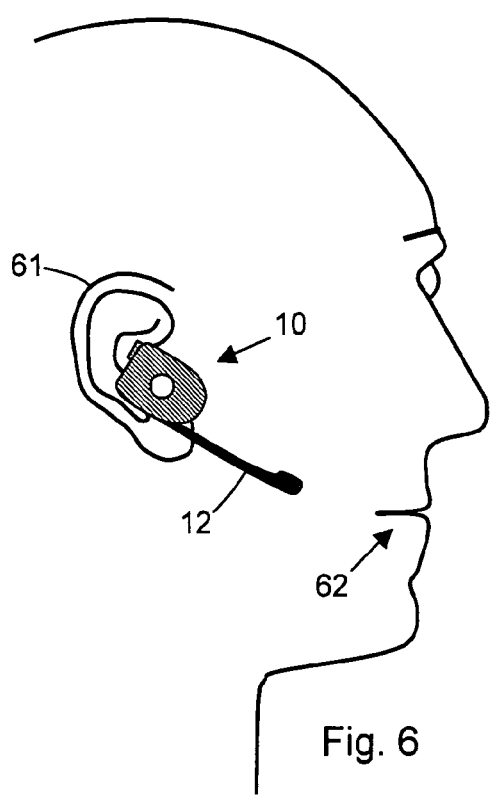
FIG. 6 is a schematic diagram of a headset being worn on the ear of a user.

FIG. 6 shows schematically how the headset 10 may be positioned on the ear 61 of a user in its extended state. In the particular exemplary embodiment, the ear fitting extension (FIGS. 3 and 4) holds the headset 10 in place on the user's ear 61, and the headset 10 is oriented such that the extended boom 12 is directed towards the user's mouth 62.

In use, the headset 10 may be conveniently and unobtrusively worn by a user on or in the user's ear 61, with the boom 12 in its retracted configuration. When a telephone call is received, which may be indicated by one of several means including vibration or emission of sound and/or light of the headset 10 or the associated telephone, the user presses the button 14 on the headset. The boom 12 then unwraps and extends from around the housing 11 and the telephone call is connected, by establishing a communications link between the headset 10 and a telephone. After use, the user may fold the boom 12 back into its retracted configuration, wrapping the boom 12 around the housing 11, and worn by a user by means of a carrying strap (for example as discussed earlier).

In one embodiment, the headset 10 may be used to operate an associated apparatus (e.g. an audio/video player/recorder) by using voice commands. For example, the headset 10 may be used with an "MP3" player to control the function of the player.

The boom can be held in the wrapped state along other regions of the boom not limited to the microphone end of the boom. The boom may be completely removeable from the housing.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A headset for audio communications comprising a speaker housing and a resiliently flexible boom for a microphone, the headset configured to provide a retracted state and an extended state, wherein the boom is configured to be resiliently biased in a wrapped configuration about the speaker housing in the retracted state and be unwrapped from the speaker housing in the extended state by release of the bias, wherein the boom comprises one or more inductive loops, and wherein one or more headset components are configured to be charged by the one or more respective inductive loops, and wherein the headset is configured such that the boom inductive loop(s) are in electrical engagement with the respective electrical component inductive loop(s) to provide for charging for one or more of the components of the headset in the retracted state.

2. The headset of claim 1, wherein the boom is configured to be wrapped around an outer perimeter of the speaker housing.

3. The headset according to claim 1, wherein the speaker housing comprises a channel, and the boom and the channel are configured to house the boom in the channel when the headset is in the retracted state.

4. The headset according to claim 1, wherein the headset comprises a user releasable latch mechanism configured to releasably hold the boom in the retracted state.

5. The headset of claim 4, wherein the latch mechanism comprises a magnetic element configured to engage with a magnetic element of the microphone to hold the boom in the retracted state.

6. The headset of to claim 1, wherein the boom comprises or is composed of a material selected from one or more of a spring steel, a beryllium-copper alloy, a nickel-titanium alloy and a polymer.

7. The headset according to claim 1, wherein the headset is configured to have a low power mode and a high power mode, and wherein the headset is configured such that the low power mode is associated with the retracted state and the high power mode is associated with the extended state.

8. The headset according to claim 1, wherein at least a portion of the speaker housing is configured to be inserted into the ear canal of a user in use.

9. A method of operating an audio communications headset, the headset configured to have a low power mode and a high power mode, and wherein the headset comprises a speaker housing and a resiliently flexible boom for a microphone, the headset configured to provide retracted state and an extended state, wherein the boom is configured to be resiliently biased in a wrapped configuration around the speaker housing in the retracted state and be unwrapped from the speaker housing in the extended state by release of the bias, and wherein the retracted state is associated with the lower power mode and the extended state is associated with the high power mode, the method comprising changing the state of the headset to switch the headset between the low and high power modes, wherein the boom comprises one or more inductive loops, and wherein one or more headset components are configured to be charged by the one or more respective inductive loops, and wherein the headset is configured such that the boom inductive loop(s) are in electrical engagement with the respective electrical component inductive loop(s) to provide for charging for one or more of the components of the headset in the retracted state.

10. The method of claim 9, wherein the high power mode is associated with the use of the headset to make use of one or more functions of an apparatus associated with the headset.

11. A non-transitory computer readable medium embodied with a computer program configured to detect the state of a headset, the headset configured to have a low power mode and a high power mode, and wherein the headset comprises a speaker housing and a resiliently flexible boom for a microphone, the headset configured to provide a retracted state and an extended state, wherein the boom is configured to be resiliently biased in a wrapped configuration around the speaker housing in the retracted state and be unwrapped from the speaker housing in the extended state by release of the bias, and wherein the retracted state is associated with the lower power mode and the extended state is associated with the high power mode, and wherein the computer program comprises computer code configured to switch the headset between the low power mode and the high power mode based on the detected configuration of the headset, wherein the boom comprises one or more inductive loops, and wherein one or more headset components are configured to be charged by the one or more respective inductive loops, and wherein the headset is configured such that the boom inductive loop(s) are in electrical engagement with the respective electrical component inductive loop(s) to provide for charging for one or more of the components of the headset in the retracted state.

* * * * *